No. 715,332. Patented Dec. 9, 1902.
R. ALEXANDER-KATZ.
ACCUMULATOR ELECTRODE.
Application filed Aug. 31, 1899.
(No Model.) 2 Sheets—Sheet 1.
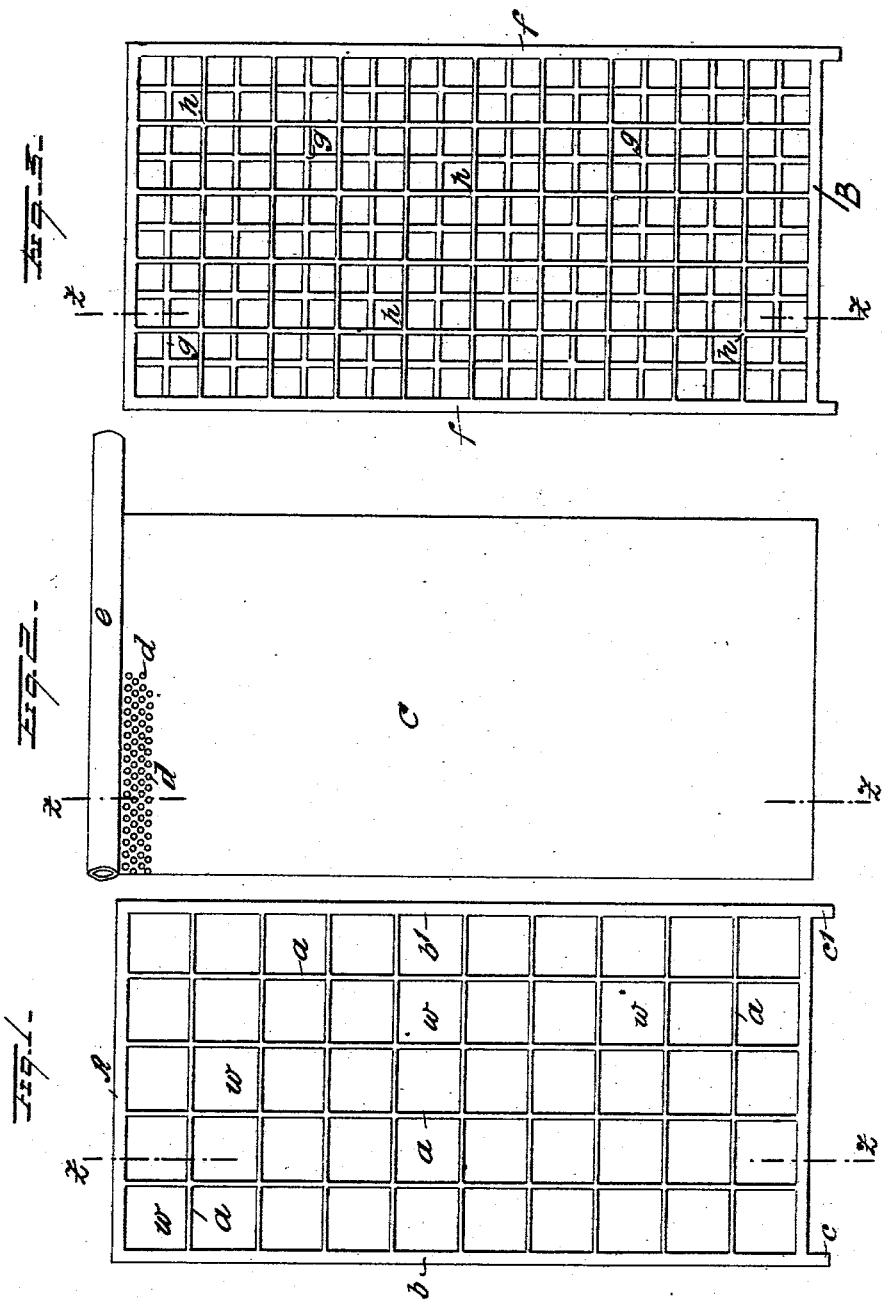
Witnesses
Inventor
R. Alexander-Katz
by his Attorney No. 715,332. Patented Dec. 9, 1902.
R. ALEXANDER-KATZ.
ACCUMULATOR ELECTRODE.
Application filed Aug. 31, 1899.
(No Model.) 2 Sheets—Sheet 2.
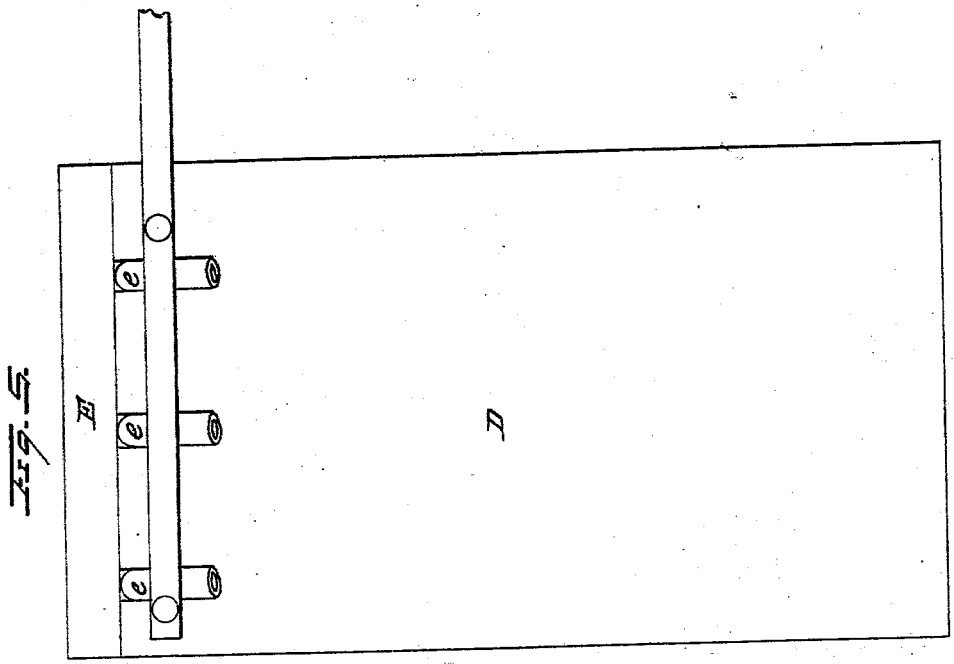
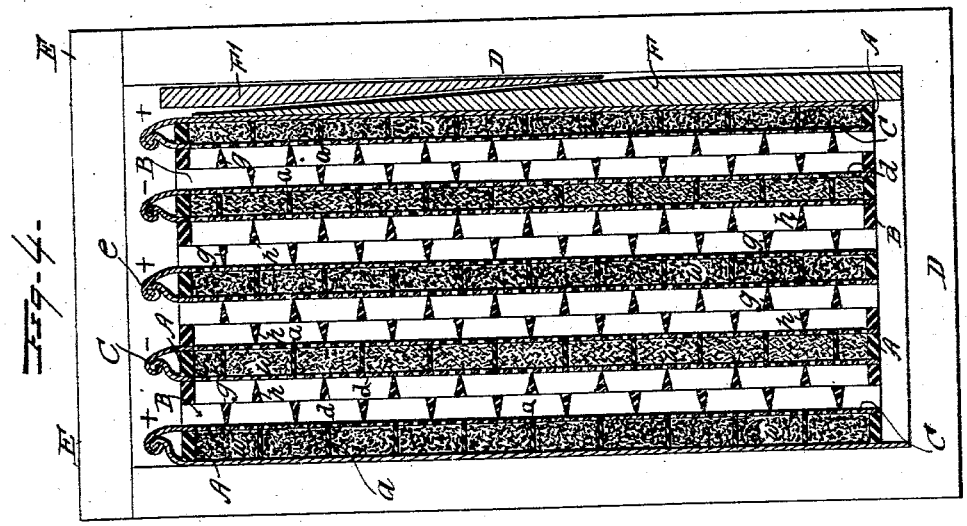
Witnesses
Inventor
R Alexander-Katz
by his Attorney

UNITED STATES PATENT OFFICE.

RICHARD ALEXANDER-KATZ, OF BERLIN, GERMANY.

ACCUMULATOR-ELECTRODE.

SPECIFICATION forming part of Letters Patent No. 715,332, dated December 9, 1902.

Application filed August 31, 1899. Serial No. 729,095. (No model.)

*To all whom it may concern:*

Be it known that I, RICHARD ALEXANDER-KATZ, a subject of the Emperor of Germany, residing and having my post-office address at Leipzigerstrasse 19, Berlin, Germany, have invented certain new and useful Improvements in Electric Accumulators, of which the following is a specification.

The present invention relates to the manufacture of electric accumulators having durable accumulator-plates which are very much lighter than those obtained by the hitherto-used methods for the same efficiency.

It is known that the great weight of lead accumulators and the frequent absence of durability are important disadvantages which hinder their general use, especially for transportation purposes, and many trials have been made for reducing the weight of their contents of lead; but as the lead conductor is made thinner its destruction by the working of the electrical power grows quicker in proportion, so that besides the stability for which the thickness of the lead conductor was always an important factor the durability also of the accumulator necessitated a considerable thickness for the lead plates used therein. The known Faure accumulator is based upon a lead plate covered with an active composition as conducting support of the element, which naturally requires a great thickness and weight of the lead plate. To obviate the bending of these supporting-plates by mechanical influences, stiffening by means of small strips of wood, caoutchouc, or by means of bars or plates of wood running along the upper or lower borders of the supporting-plates have been recommended, whereby the use of thin lead sheets was to be made possible; but the diminution of weight which can be obtained by use of these means is not great. In other constructions the leaden support-plates are trellised or form pans with bent-up borders and the active material is put therein; but the stability of such leaden supports and the durability of the plates under electrochemical influences require a certain thickness, so that the desired lightness by these means is not obtained, and even the limited diminishing of the weight of lead has an unfavorable influence on the solidity.

The present invention is based on the use of certain frames of non-conducting and lighter material, one of which carries the active material independently of the lead plate, but which also acts to support the lead plate without specific attachment thereto, while the other acts also as a support and as an acid-space grating, the lead plate being held between these frames, so that it may be of very thin quality and easily removable for replacement at any time without disturbance of the active material.

In the annexed drawings, Figure 1 is an elevation of the frame carrying the active material of the positive plate; Fig. 2, an elevation of the lead plate; Fig. 3, an elevation of the acid-spacing frame, hereinafter called the "separator." Fig. 4 is a sectional elevation of a set of plates in an accumulator-cell. Fig. 5 is an exterior elevation of said cell, showing connections.

The frame A, Fig. 1, for carrying the active material consists of two side bars $b\ b'$, a top bar, and a foot bar, the body of the frame within these bars being formed as a wide-meshed grating $a$. It can be formed in one piece out of caoutchouc, celluloid, or other acid-proof non-conductive material. It forms the supporter of the active material and possesses throughout the same thickness as that in which the active material is to be employed, as a rule not under three and not over eight millimeters. Both side bars $b\ b'$ of the frame can extend below the lower bar of the frame, and by this means form small feet $c\ c'$, on which the frame stands in the accumulator-cell. Into the spaces $w$ of this frame the active material is rolled, so that its surfaces are flush with the surfaces of the frame on both faces. The frames for the positive and negative plates, respectively, differ only in the relative displacement of the points of intersection of their gratings.

Fig. 2 represents the lead conductor, consisting of the thin lead plate C, which is provided over its area with small perforations $d\ d\ d$. The end of the lead plate is rolled up at $e$ to form a thickened lead strip for attachment of the conductor of the electric current. Against the frame A, filled as aforesaid, are laid two such lead plates C, one on each face. These cover in the active material, against which and the faces of the grating said lead plates rest. Through their many narrow perforations they allow the access of the acid to the active material. In practice the two lead plates of each plate are rolled together at the top, as shown in Fig. 4.

Fig. 3 represents the separator B, which consists likewise of non-conducting acid-proof stiff material. These separators serve at the same time to afford space for the diluted acid to support the positive and the negative accumulator-plates properly spaced from each other, to press the lead plate against the active material, to assist in supporting the lead plate, and indirectly also to support the active material. The separator B that I prefer to use herewith and which is the subject of another application for patent of even date herewith consists of a frame and of the two superposed gratings $g$ and $h$, each of which is half as thick as the general thickness of the frame. The thickness of the whole grating B is in proportion to the distance at which it is desired to place the positive plates from the negative plates. As a rule this is not under seven and not over twenty millimeters. The side bars of the frame are of this thickness, while the top and bottom bars are wholly or partly of half this thickness, as shown in Fig. 4, so as to leave spaces above and below for escape of gases and circulation of the electrolyte. The gratings $g$ $h$ are so placed or made relatively to one another that the intersections of the one cross the spaces of the other. Their combined thicknesses being equal to that of the frame, or more particularly of the side bars of the frame, their respective outer faces are in the same planes as the corresponding faces of the said side bars.

Though preferably made in one piece, this separator can be made up of two separate superposed gratings.

Fig. 4 represents a section of the accumulator-cell and at the same time a section of the supporting-plate A, the lead plate C, and the separator B on the line Z Z of Figs. 1, 2, and 3. The spaces $w$ of plates A are presumed to be filled with the active material. The plates are alternatively positive and negative, and the separators B are placed between the positive plates and the negative plates so that each open square of the gratings A corresponds to an intersection of the adjacent grating of the separator B. As may be seen, the plates are inserted loosely in the box D in such a manner that on a positive supporting-plate A there always follows the covering lead plate C, then a separator B, then a lead plate C, then a negative supporting-plate A, then a lead plate C, then a separator B again, but placed the opposite way around to the first separator B, and so on. End plates F F' or other means are finally inserted to firmly press all plates against each other. All the lead plates C are thus firmly pressed against the active material and put into conducting connection with it. As is customary, the positive plates are conductively connected on the one side, the negative plates on the other side, either inside the box or outside the box, (as in the example shown in the drawings for the positive plates in Fig. 5.) E is the cover of the box.

The advantages of the present invention are the following: In consequence of the arrangement of a frame of non-conducting, and therefore light, material, which holds the lead plates over its whole extent, very thin lead plates can be employed without being exposed to the danger of bending. By this the accumulator becomes exceedingly light. When the lead plate is damaged, so that it is no longer serviceable, it can easily be exchanged. By this means the accumulator can be given greater durability, although the lead plate is exposed to a quicker destruction on account of its thinness. If the accumulator is regularly used with regular output, it can easily be found by calculation or experience how often the lead sheets must be renewed to enable the accumulator to remain efficient for an indefinite space of time.

What I claim is, in an electric accumulator—

1. The combination of a plurality of frames of non-conductive material, each in the form of a wide-meshed grating of even thickness throughout, active material in the interstices of said grating and flush with the surfaces thereof, interposed separators each in the form of a double grating whereof the intersections of the one cross the spaces of the other, and a plurality of thin perforated lead plates, severally interposed removably between the separators and the said frames and having contact with the surfaces of said frames and separators over the whole extent of said surfaces respectively.

2. The combination of a plurality of frames of non-conductive material, each in the form of a wide-meshed grating of even thickness throughout, active material in the interstices of said grating and flush with the surfaces thereof, interposed separators each in the form of a double grating, whereof the intersections of the one cross the spaces of the other, and a plurality of thin perforated lead plates severally interposed removably between the separators and the said frames and having contact with the surfaces of said frames and separators over the whole extent of said surfaces respectively, the separators being so disposed with reference to the frames that the intersections of the separator-gratings lie crosswise of the spaces of the frames adjacent to the respective gratings.

In witness whereof I have signed this specification in the presence of two witnesses.

R. ALEXANDER-KATZ.

Witnesses:
HENRY HASPER,
WILLIAM MAYNER.